United States Patent [19]

Carriker et al.

[11] Patent Number: 5,360,294
[45] Date of Patent: Nov. 1, 1994

[54] BENTONITE LINER WITH DRAINAGE SYSTEM PROTECTION

[75] Inventors: Richard Carriker, Woodstock, Ga.; Martin Simpson, Lake In The Hills, Ill.; Thomas F. Hauck, Foster City, Calif.

[73] Assignee: James Clem Corporation, Chicago, Ill.

[21] Appl. No.: 209,686

[22] Filed: Mar. 11, 1994

Related U.S. Application Data

[63] Continuation of Ser. No. 6,221, Jan. 19, 1993.

[51] Int. Cl.$^5$ .................................................. E02D 3/12
[52] U.S. Cl. ..................................... 405/270; 405/129; 405/258
[58] Field of Search .................. 405/128, 270, 258, 43, 405/45, 268, 129; 52/169.14, 169.5

[56] References Cited

U.S. PATENT DOCUMENTS

| | | |
|---|---|---|
| 3,160,512 | 12/1964 | Cash et al. ............... 405/270 X |
| 3,186,896 | 6/1965 | Clem . |
| 4,048,373 | 9/1977 | Clem . |
| 4,103,499 | 8/1978 | Clem . |
| 4,139,588 | 2/1979 | Clem . |
| 4,209,568 | 6/1980 | Clem . |
| 4,501,788 | 2/1985 | Clem . |
| 4,534,926 | 8/1985 | Harriett . |
| 4,565,468 | 1/1986 | Crawford .............. 52/169.14 X |
| 4,810,573 | 3/1989 | Harriett ............... 52/169.14 X |
| 4,916,937 | 4/1990 | Robertson et al. . |
| 4,927,297 | 5/1990 | Simpson . |
| 4,943,185 | 7/1990 | McGuckin et al. ...... 52/169.14 X |
| 5,063,100 | 11/1991 | Alexander .............. 52/169.14 X |
| 5,174,231 | 12/1992 | White .................... 405/270 X |
| 5,180,255 | 1/1993 | Alexander . |
| 5,187,915 | 2/1993 | Alexander .............. 52/169.14 X |
| 5,237,945 | 8/1993 | White . |

OTHER PUBLICATIONS

Enviromat TM Liquid Containment Liner; Copyright 1987; Aimcor.
Enviromat/FW TM Below-grade Bentonite Waterproofing; Copyright 1987; Aimcor.
Spec Data; Enviromat TM Liquid Containment Liner; Clem; Nov. 1987.
Spec Data; Enviromat/FW TM Below-Grade Fabric/-Bentonite System; Clem, Nov. 1987.
Bentonites For Civil Engineering Applications; International Minerals & Chemical Corporation Gilbert Tallard; Slurry Trenches For Containing Hazardous Wastes; Feb. 1984.

Primary Examiner—Dennis L. Taylor
Attorney, Agent, or Firm—Baker & McKenzie

[57] ABSTRACT

A geosynthetic clay liner is provided for installation in landfill sites equipped with lower drainage systems. The self-sealing bentonite mat precludes substantial migration of bentonite downward during activation thereby avoiding clogging of the drainage systems with activated bentonite. Overlap extensions disposed on outer edges of the liners effectively contain the activated bentonite. The bentonite mat, or geosynthetic clay liner, does not require a first protective layer of geotextile material disposed below the bentonite clay liners to protect the drainage system.

16 Claims, 2 Drawing Sheets

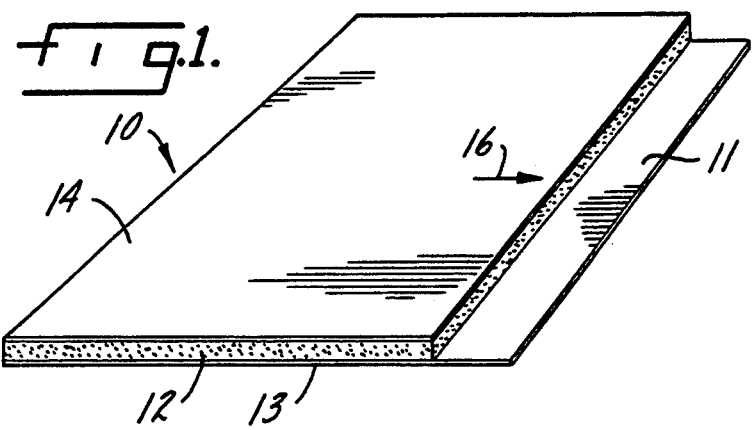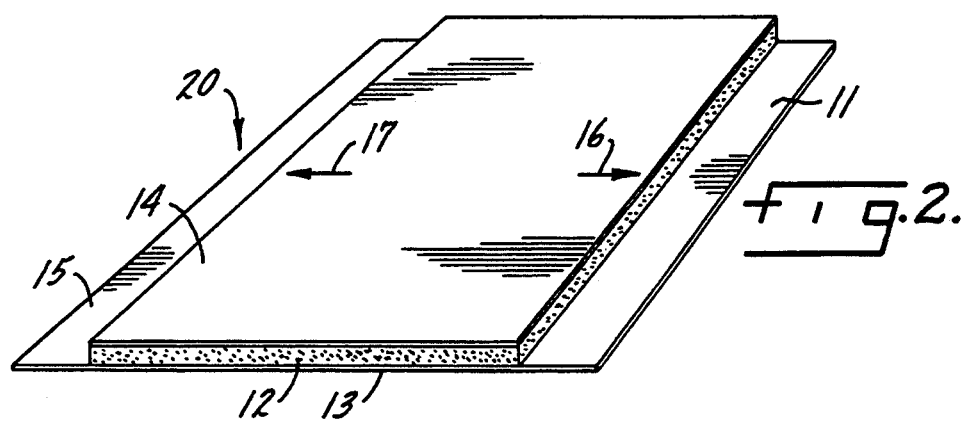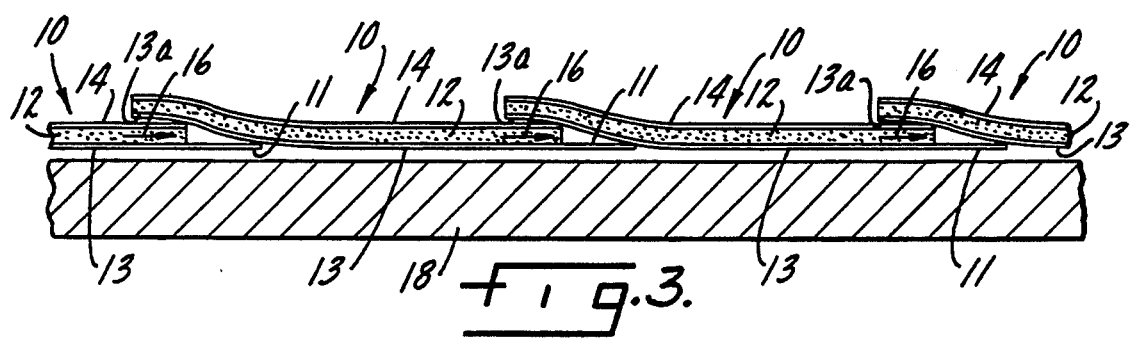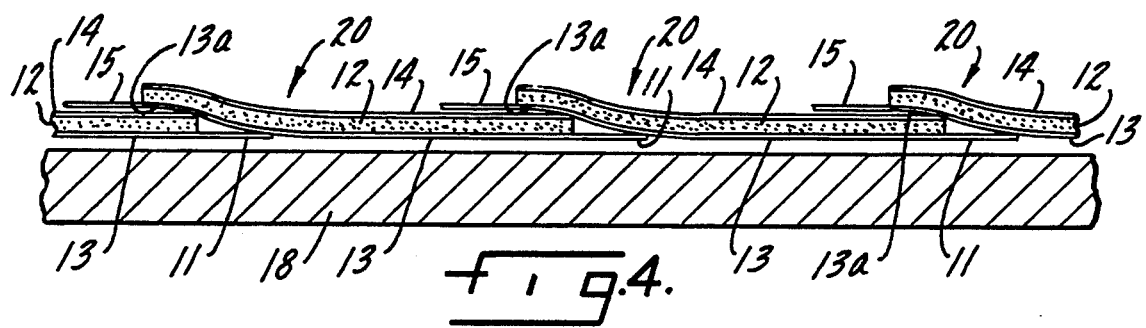

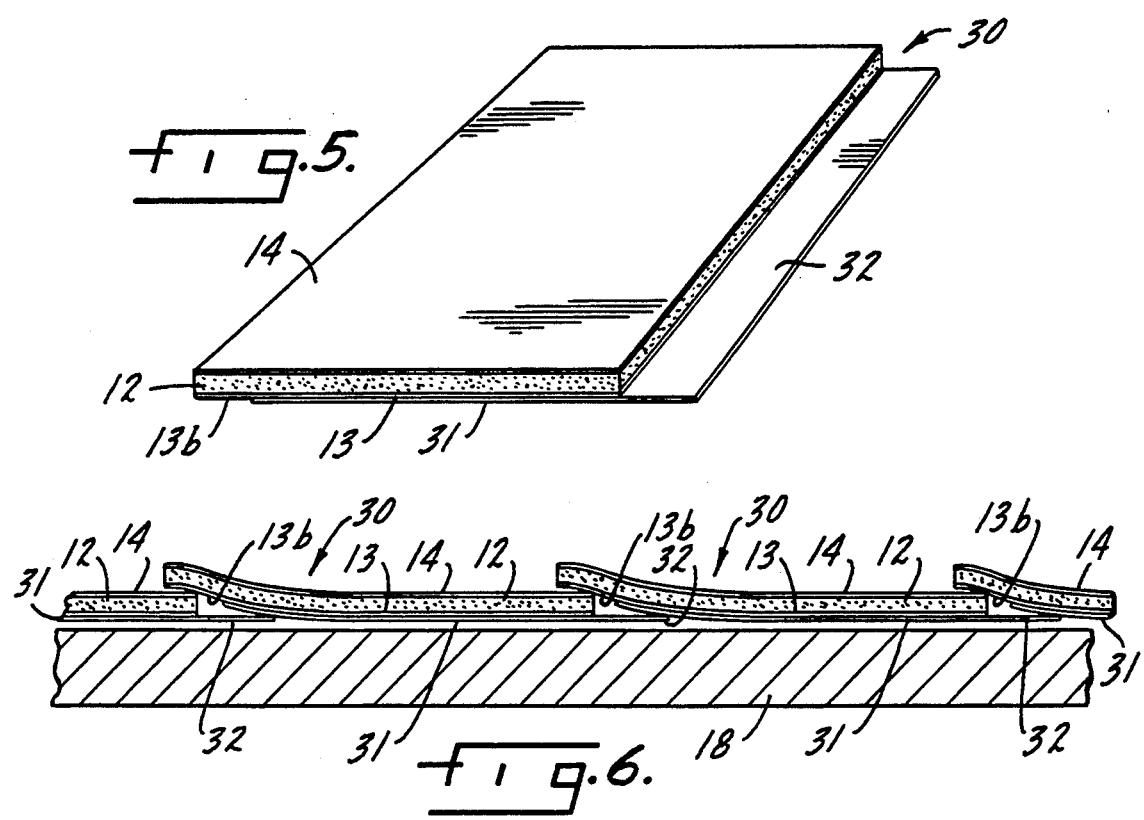

BENTONITE LINER WITH DRAINAGE SYSTEM PROTECTION

This application is a continuation of application Ser. No. 08/006,221, filed Jan. 19, 1993.

This invention relates generally to an improved geosynthetic clay liner for use in providing a low permeability bottom barrier for landfills and other liquid containment applications. Specifically, the invention relates to an improved geosynthetic clay liner that precludes substantial migration of hydrated bentonite to locations where the bentonite will clog or otherwise interfere with a drainage system.

BACKGROUND OF THE INVENTION

The concept of using geosynthetic clay liners made with bentonite for lining landfill sites is well-known. One problem addressed by the present invention involves the prevention of bentonite falling or extruding out of the edges of the geosynthetic liners and migrating into the drainage system. Activated bentonite will clog a drainage system rendering it ineffective and therefore a bentonite liner that prevents this occurrence is desired.

Another related problem addressed by the present invention is the use of a primary carrier sheet with a high enough modulus so it will not stretch downward under force and engage the drainage system thereby reducing the cross sectional area otherwise available for drainage of leachate.

Bentonite is a clay material that expands and becomes substantially impermeable upon being exposed to water. When a layer of dry bentonite is wetted, the expanding bentonite will form a low permeability barrier. However, a problem is created when the expanding bentonite is not effectively contained and allowed to migrate downward toward the drainage system. The activated bentonite will clog a drainage system.

Many modern landfills are constructed with an underlying drainage system. Drainage systems may come in the form of a drainage net or a layer of rock, aggregate or sand. A drainage system is intended to prevent the accumulation of water or other liquid, sometimes referred to as leachate, at the bottom of the landfill. Further, a drainage system disposed beneath the landfill enables environmental regulators to test for the leakage of toxic or other hazardous materials from the landfill itself.

Therefore, in some landfill designs, it is essential to keep the drainage system unclogged to allow for the drainage of liquid beneath the bottom of the landfill. In order to alleviate the problem of bentonite clogging the drainage system, some landfill owners have installed an extra geotextile layer, or textile layer, below the bentonite liner to protect the drainage system. The extra geotextile layer is expensive in terms of both materials and labor.

Thus, there is a need for a geosynthetic liner that contains wastes and hazardous materials and prevents substantial downward migration of activated bentonite toward the drainage system. Such a bentonite liner with drainage system protection will eliminate the need for an additional layer of geotextile disposed below the bentonite resulting in considerable cost savings to the landfill owner or contractor.

A geosynthetic clay liner (GCL) normally includes: (1) a primary carrier sheet, also known as a primary backing, a primary textile or a primary carrier; (2) a cover sheet, also known as a secondary textile, a secondary carrier sheet or scrim; and (3) a layer of bentonite disposed therebetween.

In terms of industry nomenclature, the terms primary textile, primary backing, primary carrier and primary carrier sheet are often used interchangeably. Unless otherwise noted, the primary carrier sheet will refer to the more durable textile or sheet of a geosynthetic liner and is normally disposed downward upon installation. However, primary carrier sheets may be disposed upward upon installation, depending upon the intended purpose of the geosynthetic liner. Also, the terms secondary textile, secondary carrier sheet, scrim and cover sheet may also be used interchangeably. Unless otherwise note, the term cover sheet will refer to the textile or sheet that is connected or otherwise attached to the primary carrier sheet with a layer of bentonite disposed therebetween. Normally, the cover sheet is disposed upward upon installation, but may also be disposed downward, depending upon the intended purpose of the geosynthetic liner.

The layer of bentonite may be held in place by: gluing the bentonite to the primary carrier sheet or the cover sheet; or the bentonite may be suspended between the two sheets and held in place by needle-punched threads extending from one sheet to the other sheet; or the bentonite may be held in place by stitch bonding the cover sheet to the primary carrier sheet; or any combination of the above. The cover sheet may be made from material that is of a lighter weight than the primary carrier sheet if its main purpose is to protect the bentonite layer during installation. Further, geosynthetic clay liners within the scope of this invention may include a primary carrier sheet only, and no cover sheet. Depending upon the design of the landfill, the cover sheet as well as the primary carrier sheet may be disposed up or down after installation.

BRIEF DESCRIPTION OF THE INVENTION

The present invention satisfies the above-mentioned need by providing a geosynthetic clay liner for use in forming a continuous clay layer in the bottom of landfills or other liquid containment sites. The improved geosynthetic clay liner includes an overlap adjacent to the clay-bearing portion of the liner. The overlap limits movement of activated bentonite to generally lateral directions as opposed to vertical directions.

The geosynthetic clay liner provided by the present invention includes the clay layer, preferably bentonite, carried by at least one primary carrier sheet. The primary carrier sheet coated with clay is preferably provided in rolls for easy installation at the landfill site. At least one outer edge of the primary carrier sheet includes an overlap section to be positioned beneath an adjacent geosynthetic clay liner. The overlap section should be fabricated from materials that preclude substantial migration of activated bentonite through it. When made of such material, the overlap section will contain the activated bentonite and limit its migration to lateral movement as it expands.

One preferred embodiment includes a lower primary carrier sheet, an upper cover sheet and a layer of bentonite disposed therebetween. The lower primary carrier sheet is made from material that precludes substantial migration of bentonite through it. The lower primary carrier sheet also includes at least one overlap section disposed along at least one outer edge of the primary carrier sheet. The overlap section may be an integral extension of the lower primary carrier sheet or a separate sheet sewn or otherwise attached to at least one outer edge of the lower primary carrier sheet. The lower primary carrier sheet is laid down in the landfill site above the drainage system. A plurality of liners are rolled out alongside each other, preferably with some overlap of the bentonite layers. The overlap sections engage the underside of the adjacent geosynthetic clay liner. Therefore, the overlap section "catches" any activated bentonite that migrates out of the liner to which the overlap section is attached. The overlap also "catches" or contains hydrated bentonite which may migrate from the liner disposed immediately above the overlap section.

In another alternative embodiment, an overlap section is provided along each outer edge of each geosynthetic clay liner. One overlap section engages an underside of a lower primary carrier sheet of an adjacent geosynthetic clay liner. The other overlap section lies on top of an adjacent geosynthetic clay liner, one outer edge of each liner being disposed below an adjacent liner and one outer edge of each liner being disposed on top of an adjacent liner.

Yet another, and more expensive embodiment of the present invention, includes a bentonite layer disposed between an upper primary carrier sheet and a lower scrim sheet. The scrim is of a more open structure than the upper primary carrier sheet. The upper primary carrier sheet is more durable than the scrim so it will withstand workers walking on the upper primary carrier sheet during installation. A third sheet is attached to the scrim and is of the same general width as the scrim sheet. To create the overlap or non-clay bearing extension, the third sheet is shifted 6-36" to one side of the scrim sheet thereby creating a 6-36" overlap section at one outer edge of the lower primary carrier sheet and leaving a 6-36" gap of exposed lower scrim sheet at the opposing outer edge. Upon installation, each overlap section will be disposed underneath a section of exposed scrim. Upon activation, the expanding bentonite will migrate through the exposed section of scrim to seal with the overlap section of the third sheet disposed immediately below.

It is therefore an object to the present invention to provide an improved geosynthetic clay liner that protects the drainage systems disposed therebelow from the clogging effects of hydrated bentonite.

It is also an object of the present invention to provide a lining system for containing wastes including a plurality of geosynthetic clay liners disposed alongside of each other with the means for containing activated bentonite and precluding substantial migration of activated bentonite downward into a drainage system.

Another object of the present invention is to provide an improved method of forming continuous clay layers in the bottom of landfills without interfering with drainage systems disposed therebelow.

BRIEF DESCRIPTION OF THE DRAWINGS

This invention is illustrated diagrammatically in the accompanying drawings, wherein:

FIG. 1 is a perspective view of a geosynthetic clay liner made in accordance with the present invention;

FIG. 2 is a perspective view of yet another geosynthetic clay liner made in accordance with the present invention;

FIG. 3 is a side-sectional view of the geosynthetic clay liner shown in FIG. 1 as installed in the bottom of the landfill;

FIG. 4 is a side-sectional view of the geosynthetic clay liner shown in FIG. 2 as installed in the bottom of a landfill;

FIG. 5 is a perspective view of an alternative embodiment of the present invention; and FIG. 6 is a side-sectional view of the geosynthetic clay liner shown in FIG. 5 as installed in the bottom of a landfill.

DETAILED DESCRIPTION OF THE INVENTION

Like reference numerals will be used to refer to like or similar parts from Figure to Figure in the following description of the drawings.

The dramatic improvement contributed by the present invention is best understood after consideration of conventional geosynthetic clay liners. In general, bentonite is disposed on top of one primary carrier sheet or between a primary carrier sheet and a cover sheet (or scrim) to form a geosynthetic clay liner. The liner is usually provided in roll form and is laid down on the bottom of the landfill not unlike a layer of carpet. The outer edges of the bentonite liners are normally open and, upon activation, the bentonite is free to expand outward through the outer edges in the bentonite liner and will eventually migrate downward to the drainage system which is a functional part of many modern landfills. Because of the dramatic ability of bentonite clay to expand upon being activated by water, bentonite will clog a drainage system rendering it inoperable.

To overcome this problem, landfill owners must lay a protective layer of geotextile material down before laying the bentonite liners. This procedure is costly. To overcome the bentonite-clogging problem without the need for installing an additional layer of geotextile material, the present invention provides the bentonite liner 10, as seen in FIG. 1, with an overlap extension 11. The overlap extension 11 is fabricated from materials that preclude substantial migration of bentonite 12 through it. As the geosynthetic clay liner 10 is laid down on the bottom of a landfill site, the lower primary carrier sheet 13 is laid down on top of a drainage system (not shown in FIG. 1; see FIGS. 3, 4 and 6). The upper cover sheet 14, which is optional for achieving the objects of the present invention, faces upward and protects and contains the bentonite 12 during shipment and installation of the liner. The cover sheet 14 also helps to contain the expanding bentonite 12 after it is activated.

Alternatively, the geosynthetic clay liner 20 shown in FIG. 2 will include two overlap sections 11 and 15 disposed on either side of the lower primary carrier sheet 13. Thus, as seen in FIGS. 1 and 2, activated bentonite 12 migrating outward in the direction of arrows 16, 17 will be caught or contained by the overlap sections 11, 15 respectively.

FIG. 3 is an illustration of one method of installing the geosynthetic clay liner 10 of FIG. 1. The lower primary carrier sheets 13 are laid down at the bottom of a landfill on top of the drainage system 18. Each adjacent geosynthetic clay liner 10 is laid down on top of an overlap sheet 11 and an outer portion 13a of each lower primary carrier sheet 13 overlaps or engages the top of an upper cover sheet 14 of an adjacent geosynthetic clay liner 10. Because the lower primary carrier sheet 13 and overlap sheet 11 are fabricated from materials that preclude substantial bentonite migration, the bentonite migrating in the direction of the arrow 16 will be contained by the overlap extension 11.

The material of the lower primary carrier sheet 13 and the overlap sheet 11 is preferably made from a fabric that will prevent hydrated bentonite from extruding through the fabric as the bentonite expands. A woven geotextile known as Amoco 4005 has been found to be effective. Amoco 4005 is a slit film woven polypropylene fabric that has been needle-punched with one to one and one-half ounces per square yard of staple polypropylene fibers of approximately 6 denier. Amoco 4034 is a similar fabric that is also suitable for fabricating the primary carrier sheet 13. Amoco 4034 is a slit film woven polypropylene fabric that has been needle-punched with one-half to three-quarter ounce per square yard of staple polypropylene fibers of approximately 6 denier. Up to four ounces of staple polypropylene fibers may be used. The construction of the weave is approximately 24 warp and 12 weft slit film fibers per inch in a flat woven pattern. This fabric has been found to be an effective primary carrier sheet or primary carrier 13 and has also been found to be an effective overlap flap 11, either as an attachment to the primary carrier sheet 13 or as an integral extension thereof.

FIG. 4 is an illustration of one method of installing the geosynthetic clay liner 20 shown in FIG. 2. Each lower primary carrier sheet 13 overlaps an upper cover sheet 14 as well as engages an overlap sheet 11 of an adjacent geosynthetic clay liner. The additional overlap section 15, in combination with the overlap section 11 of an adjacent liner, acts to contain bentonite between an overlap section 15 and an overlap section 11 thereby creating a seal along two adjacent outer edges of two adjacent geosynthetic clay liners 20. The improved seal provided by the geosynthetic clay liner 20 further ensures that leakage of liquids from the landfill through the bentonite liners 20 will be avoided.

A foreseeable alternative embodiment not specifically shown in the Figures would include extensions 11, 15 that are supplied separate sheets and thereafter are sewn or otherwise attached to the lower primary carrier sheet 13. Such an extension 11, 15 could be a non-fabric such as a plastic film or other material that will restrain the bentonite 12. This embodiment could also involve the modification of an existing clay liner without extensions into a clay liner with extensions.

An alternative embodiment of the present invention is shown in FIGS. 5 and 6. Referring to FIG. 5, a bentonite layer 12 is disposed between an upper cover sheet 14 and a lower primary carrier sheet 13. The upper cover sheet 14 is fairly durable so it will resist damage that may be caused by installation workers walking on the bentonite mat 30.

A third sheet 31 is sewn or otherwise attached to the underside of the lower primary carrier sheet 13. The third sheet 31 is made from a material with a closed structure, such as TYPAR 3601 which precludes or minimizes bentonite migration. The third sheet 31 is sewn to the underside of the lower primary carrier sheet 13 with an offset that creates a gap 13b of exposed primary carrier sheet 13 on one outer edge of the mat 30 and an overlap sheet 32 at an opposing edge of the mat 30.

TYPAR 3601 is a 6 oz. per square yard non-woven heat-bonded fabric. TYPAR 3601 has been used as a separate, additional layer under geosynthetic clay liners before in order to protect the drainage system. Previous, use of TYPAR 3601 was limited to installations where TYPAR 3601 was installed as a separate layer, before the installation of the geosynthetic clay liner.

FIG. 6 illustrates an installation scheme for the mat 30 shown in FIG. 5. Each overlap section or sheet 32 engages the underside of a gap 13b in the lower primary carrier sheet 13. Upon activation, the bentonite will migrate through the gaps 13b and seal with the overlap sheets 32 to improve the seal between adjacent mats 30.

In yet another alternative embodiment, 10 oz. non-woven TREVIRA polyester material may be used for the third sheet 31. TREVIRA is a 10 oz. per square yard needle-punched polyester non-woven fabric.

The width of the overlap sheet or non-clay bearing extensions 11 or 32 may be from 6″ to 36″ but are preferably from 18″ to 2 feet. The width of the exposed gaps 13b in the lower primary carrier sheet may be from 3″ to 24″ but is preferably from 6″ to 12″. Because the third sheet 31 is preferably wider than the lower primary carrier sheet 13, the overlaps or non-clay bearing extensions 32 will be wider than the gaps 13b.

Thus, the present invention provides an improved geosynthetic clay liner that provides against clogging of drainage systems without the need for laying an additional protective geotextile layer prior to the installation of the geosynthetic clay liners. The present invention saves cost in terms of materials and labor and ensures proper working order of the drainage system. The present invention is applicable to both landfill sites with hazardous wastes and non-hazardous wastes.

Although only a few preferred embodiments of the present invention have been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

We claim:

1. A geosynthetic clay liner for use in forming a continuous clay layer, the geosynthetic clay liner comprising:

a clay layer carried by an upper surface of at least one lower primary carrier sheet, the clay layer and the lower primary carrier sheet generally defining a surface area, at least one outer edge of the liner including means for forming a sealed overlap with at least one adjacent geosynthetic clay liner upon activation of the clay layer by an activating liquid, the means for forming a sealed overlap including means for containing the clay layer and means for limiting movement of the clay layer to generally lateral movement upon activation thereof, the means for containing the clay layer includes a non-clay bearing extension of the primary carrier sheet, the non-clay bearing extension is made of material through which clay cannot substantially migrate, the means for forming a sealed overlap also being characterized as including an activated clay seal disposed between an upper surface of the non-clay bearing extension and an undersurface of a primary carrier sheet of the adjacent geosynthetic clay liner after activation of the clay layer and migration of activated clay laterally outward to provide activated clay between the upper surface of the non-clay bearing extension and the undersurface of the primary carrier sheet of the adjacent geosynthetic clay liner, the means for forming a sealed overlap being free of additional mechanical attachment means such as snaps, VELCRO ®, buttons, straps or ties.

2. The geosynthetic clay liner of claim 1,
wherein the non-clay bearing extension is integral to and formed with the primary carrier sheet.

3. The geosynthetic clay liner of claim 1,
wherein the non-clay bearing extension is an initially separate sheet attached to the primary carrier sheet.

4. The geosynthetic clay liner of claim 1,
wherein the lower primary carrier sheet and the non-clay bearing extension are made of fabric woven from slit film polypropylene fibers, the slit film polypropylene fibers of the fabric having a width from about 1/32-inch to about ⅛-inch.

5. The geosynthetic clay liner of claim 4,
wherein staple polypropylene fibers are needle-punched into the fabric,
the staple polypropylene fibers contribute from about 0.5 to about 4.0 ounces per square yard to the weight of the fabric.

6. The geosynthetic clay liner of claim 1,
wherein the non-clay bearing extension extends from at least one outer edge a distance of from about 3 to about 36 inches, the non-clay bearing extension engaging at least a portion of an underside of an adjacent geosynthetic clay liner.

7. The geosynthetic clay liner of claim 1,
wherein the geosynthetic clay liner includes two non-clay bearing extensions disposed at opposing outer edges of the liner.

8. The geosynthetic clay liner of claim 1,
wherein the clay layer is carried by and, prior to activation, is disposed between an upper cover sheet and the lower primary carrier sheet.

9. A lining and drainage system for containing waste, the system comprising:

a plurality of geosynthetic clay liners overlying a drainage system, the geosynthetic clay liners including clay layers, each clay layer carried by at least one lower primary carrier sheet, the geosynthetic clay liners being overlapped and forming seals at locations where the clay layers meet one another at the outer edges thereof, the seals being formed by activation of clay in the clay layers, the plurality of geosynthetic clay liners having means for containing clay in the geosynthetic clay liners after activation of the clay with an activating liquid, the means for containing the clay in the geosynthetic clay liners providing means for limiting movement of the clay to generally lateral movement upon activation thereof, the means for containing the clay in the geosynthetic clay liners also providing means for preventing the clay from entering and obstructing the drainage system, the means for containing the clay layer including two non-clay bearing extensions disposed on opposing outer edges of each primary carrier sheet, the non-clay bearing extensions being made of material through which clay cannot substantially migrate, the non-clay bearing extensions also being characterized as accommodating an activated clay seal disposed between an upper surface of each non-clay bearing extension and an undersurface of a primary carrier sheet of the adjacent geosynthetic clay liner after activation of the clay layer and migration of activated clay laterally outward to provide activated clay between the upper surface of each non-clay bearing extensions and the undersurface of the primary carrier sheet of the adjacent geosynthetic clay liner, the non-clay bearing extensions being free of additional mechanical attachment means such as snaps, VELCRO ®, buttons, straps or ties.

10. The lining and drainage system of claim 9,
wherein the non-clay bearing extension and the lower primary carrier sheet that carries the clay layer of each geosynthetic clay liner are integral and are formed from at least one unitary lower primary carrier sheet.

11. The lining and drainage system of claim 9,
wherein each of the non-clay bearing extensions is an initially separate sheet attached to an underside of the lower carrier.

12. The lining and drainage system of claim 9,
wherein the lower primary carrier sheets and the non-clay bearing extensions are made of fabric woven from slit film polypropylene fibers, the slit film polypropylene fibers having a width of about 1/16 inch.

13. The lining and drainage system of claim 12,
wherein staple polypropylene fibers are needle-punched into the fabric,
the staple polypropylene fibers of the fabric contributing from about 0.5 to about 4.0 ounces per square yard to the weight of the fabric.

14. The lining and drainage system of claim 9,
wherein each clay layer is carried by and, prior to activation, is disposed between an upper cover sheet and a lower primary carrier sheet.

15. The lining and drainage system of claim 14,
wherein a third sheet is attached to an underside of the lower primary carrier sheet and is offset leaving one edge of the underside of the lower primary carrier sheet exposed and a portion of the third sheet extending outward from an opposing edge of the lower primary carrier sheet to form a non-clay bearing extension.

16. A method of forming a continuous clay layer without substantially interfering with a drainage system disposed below the continuous clay layer, the method comprising:

covering an area with a plurality of geosynthetic clay liners, each geosynthetic clay liner including
a lower primary carrier sheet and at least one clay layer disposed on an upper side of the lower primary carrier sheet, the clay layer and lower primary carrier sheet having outer edges in matching registry,
at least one outer edge including a non-clay bearing extension for overlapping underneath an outer edge of a lower primary carrier sheet of an adjacent geosynthetic clay liner, the matching outer edges of the clay layer and the primary carrier sheet and the non-clay bearing extension overlapping underneath and engaging a portion of an underside of the lower primary carrier sheet of the adjacent geosynthetic clay liner, engaging a portion of the underside of each lower primary carrier sheet with at least one non-clay bearing extension of the lower primary carrier sheet of the adjacent geosynthetic clay liner and the matching outer edges of the clay layer and primary carrier sheet of the adjacent geosynthetic clay liner, activating the clay layers with an activating liquid.

* * * * *